Dec. 3, 1946.   E. SWARTZ   2,412,106
METHOD OF AND APPARATUS FOR DISSOLVING SALT
Filed Sept. 16, 1944

Inventor
Edward Swartz
by Roberts, Cushman & Grover
att'ys

UNITED STATES PATENT OFFICE 2,412,106

METHOD OF AND APPARATUS FOR DISSOLVING SALT

Edward Swartz, Belmont, Mass.

Application September 16, 1944, Serial No. 554,526

3 Claims. (Cl. 23—272)

This invention relates to a method of and means for dissolving salts and producing aqueous solutions of predetermined concentration.

In many arts, it is necessary to have a ready supply of aqueous solutions of salts, of dependable concentrations and in large volumes. Thus in the fish industry it is a customary requirement to have brine solutions of common salt. These may vary from dilute solutions for some purposes up to saturated solutions, for others. It is sometimes the practice to make a very concentrated solution and then dilute it to the specific concentration required.

It is desirable to have a continuous and sufficient supply of the concentrated salt solution. It is also desirable to have a continuous supply of salt solution at whatever concentration may be most convenient, either to dilute to a lower required concentration, or to use directly at the concentration prepared.

It is therefore an object of the present invention to provide a method of and apparatus for dissolving salt, in which an aqueous solution may be prepared of pre-determined concentration, regulatable from time to time, but constant at any given concentration so long as desired. Other objects will appear from the following disclosure.

The method and apparatus of the present invention may be used in all types of food processing and industrial manufacturing plants, such as meat packing, food canning, fish processing, chemical and munitions manufacturing, textile mills, tanneries, etc., in which solutions and especially aqueous solutions of finely divided salts, are required in their operations. They are automatic in operation, assuring the operator of uniform solutions, of reliable concentration, and in such quantities as he may require, at all times.

As a part of the present invention it is found that if water is dispersed uniformly beneath a bed of finely divided salt, which is of uniform depth, the water will accumulate and pass upwardly through the salt, and upon emerging at the upper surface of the bed will constitute an aqueous solution of uniform composition. It is further found that with a constant supply of water, in this manner, a constant concentration of the aqueous solution may be maintained. But it is further found that the specific concentration of the aqueous salt solution produced is proportionate to the depth of the salt bed, as well as to the rate at which the water flows through it. Hence, as the salt dissolves and the depth of the salt bed decreases, the concentration of the aqueous solution produced by a constant supply of water, will decrease. On the other hand if the depth of the salt bed is increased, as by loading more salt into it, the constant supply of water will result in a salt solution of increasing concentration. Accordingly, the concentration of the salt solution may be controlled by controlling the depth of the salt bed, or may be maintained constant by keeping the depth of the salt bed constant, with a constant supply of fresh water being introduced beneath it.

The invention will be described with reference to its application to the preparation of salt brines for the fishing industry, and to apparatus suitable for this purpose, as shown in the accompanying drawing, in which.

Figure 1:
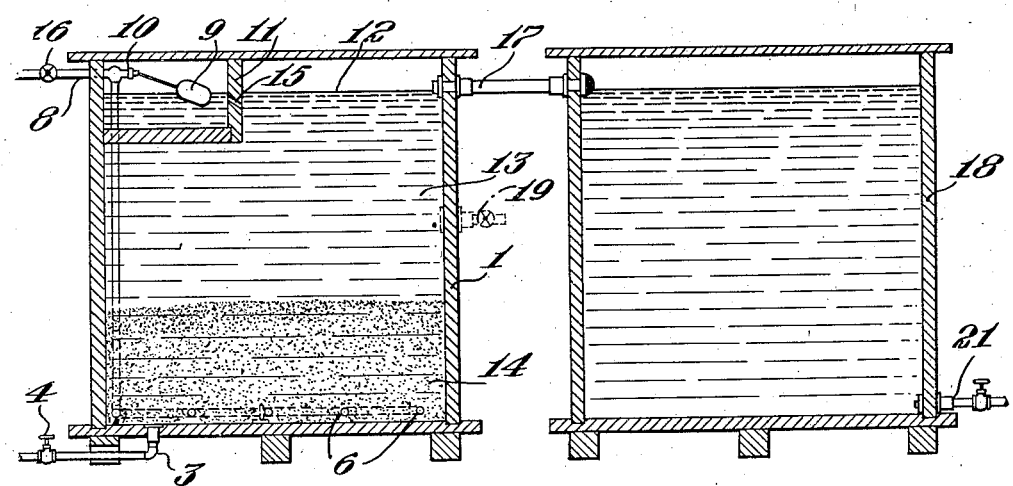
Fig. 1 is a front elevation of a dissolving tank and a reservoir tank.
Figure 2:
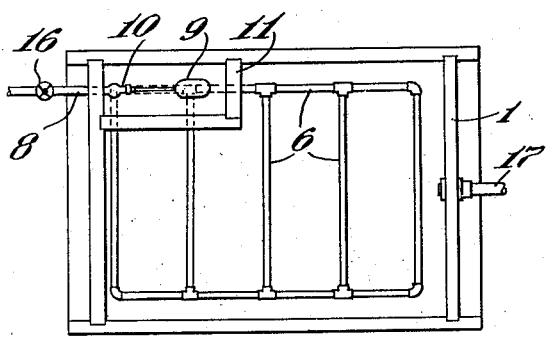
Fig. 2 is a plan view of the dissolving tank of Fig. 1 showing the valve inlet control means and means for dispersing the incoming water supply uniformly throughout the bottom of the tank.
Figure 3:
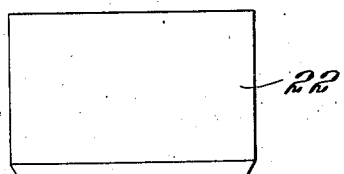
Fig. 3 is an enlarged detail of the water inlet and distributing means showing the downward direction of the water-dispensing jets.

The dissolving tank 1, as shown in Fig. 1 may be constructed of non-corrosive materials, such as tightly joined wooden boards, well-seasoned, caulked and painted to avoid leakage. It will ordinarily be of stout construction to withstand the weight of salt and water, which it is called upon to hold in quantity in order to have the desired high capacity of output. But smaller constructions are effective, especially in view of the automatic operation and provision of a brine reservoir, as will be hereinafter pointed out.

The tank 1 may be conveniently mounted upon supporting joists above the floor of the tank, to provide room for drain 3 and draw-off valve 4, through which the tank may be emptied and washed out.

Spaced slightly above the bottom, on short legs 5, is a rectangular grid work 6 of water pipes, covering the entire cross-section of the tank and having numerous uniformly and closely spaced outlets 7 in the under surfaces of the pipes, through which water from the main supply line 8, under preferably constant head or pressure, is dispersed uniformly and continuously throughout the entire bottom surface of the tank. This water supply may be positively regulated, and also checked by the float 9 and float valve 10, mounted in the box 11 at the top of the tank and operated by the level 12 of the salt solution 13 as it accumulates therein above the bed of fine granular salt 14.

It is found desirable to provide the outlets 7 of such size and number that their total cross-sectional area shall be about equal to the cross-section of the main supply line 8, so that there shall be no appreciable resistance to the pressure or inflow of fresh water therethrough, on the one hand, and no considerable slowing down of the rate of flow of fresh water into the tank, on the other.

The solid salt crystals, though fine and capable of clogging the outlets 7 do not do so, for the constant operation of the continuous supply of fresh water not only agitates the salt in the bottom of the tank and dissolves it most rapidly at this point, but constantly and continuously moves upward through the bed of salt, since it has no other direction in which it is free to move. Moreover as it moves upward it is replaced by more fresh water which continues the dissolving action upon the salt crystals. In this way the normal tendency for masses of wet salt to cake together or lump up is entirely prevented.

Moreover, when the incoming supply of water is shut off, the water in the supply pipes 6 will continue to fill under pressure, and serve to resist and prevent the entrance of the solid or crystalline particles of salt into the grid through the outlets 7, even though they tend to settle under their own weight and to spread out over the bottom of the tank.

The casing for the float valve is also conveniently made of wood, and preferably thick, with sufficient number of perforations 15 therethrough, to permit the salt solution to enter freely for the operation of the valve. These perforations are preferably also inclined upwardly from the outside to the inside of the casing, so that if any salt crystals come into contact with it, either when changing the tank with the salt, or by agitating, and slopping the brine, with its suspended crystals, against and into the casing, or by evaporation of water from brine in or wetting the casing, etc., such crystals will be loosened or re-dissolved by the salt solution and flow or be washed downward and back into the salt solution and will not accumulate on the perforations nor on the inside of the casing, thus preventing any interference with the proper operation of the float valve.

In operation, the tank 1 may be loaded with a charge of salt 14, which must sufficient at least to cover the grid of the water-dispersing pipes 6, to an even depth. But above such a covering layer, the depth of the salt bed will be determined by the concentration of salt solution required. Thus with a bed of common salt about 4' x 3' and 22" deep, and an inflow of water through the distributing pipes at the rate of 3 gallons per minute, a brine solution accumulated above the salt bed which had a concentration of 99%–100% of a saturated solution.

Such operation may be continued and maintained constant (and equal to the set of the inlet valve 16) by letting the salt solution overflow through the outlet 17 (which is larger than the inlet 8) under regulation of the float valve, into a second reservoir 18 for the saturated salt solution. When the latter is filled to the level of the overflow outlet 17 the ball 9, in the box 11 will shut off the inflow of fresh water through valve 10. The salt solution in both the reservoir and in the dissolving tank will then become quiescent and remain at the same fixed concentration of salt.

In some cases, the reservoir may be dispensed with, and the dissolving tank may be made to serve as its own reservoir, by closing the overflow 17, and providing for withdrawal of the brine at a lower level, indicated in dotted lines at 19. Since the salt solution which accumulates above the salt bed at all levels is of the same concentration a uniform product will be thus obtained, and since the maximum water inflow through the float valve, is fixed, even when wide open, the solution which is replaced is of the same concentration as that which has been withdrawn. But of course the volume of brine which is thus available for use at one time is less than when a reservoir 18 is provided for accumulating salt solution by overflow from the dissolving tank, in which case the dissolving tank may operate through longer periods or almost continuously, and thus provide and maintain the supply of prepared brine in much greater volume.

Since the rate of diffusion of concentrated salt solution from the bed of salt upwardly through the superposed body of salt solution is very slow, it is negligible as affecting the concentration of previously formed salt solutions standing above the salt bed, even though it be allowed to stand in this relationship without being withdrawn, for hours or even days, as overnight, holidays, week-ends, etc. This is true not only with saturated brines but with more dilute brines, produced by employing a thinner salt bed or a more rapid inflow of water or both.

But for larger volumes of brine solution to be available for withdrawal at a high rate of speed, or for use while changing the arrangement of the apparatus for a different concentration of the salt solution to be produced, the provision of the reservoir tank is desirable.

As already mentioned, when the reservoir tank 18 is filled with brine solution from the overflow 17, the surface of the solution in the two tanks standing level, the float valve 10 will close, no more water will be introduced, and the volume and concentration of solution in the two tanks will be and remain the same. Upon withdrawing solution from the reservoir through outlet 21, by gravity or by pumping or the like, the level of solution in the reservoir 18 will fall, solution will overflow from the dissolving tank, the float valve will drop, and fresh water again introduced and dispersed beneath the bed of salt, dissolving more salt and producing more brine.

As these operations continue, the bed of salt in the dissolving tank will decrease in thickness or depth. The distance through which the incoming flow of fresh water passes in contact with the crystals of solid salt will be decreased accordingly, and the concentration of salt solution formed by such dissolution will fall off.

This tendency may be offset by manually reducing the set of the valve 16 so that though the float valve 10 is fully opened the rate of introduction of water is less, and by passing through the thinner salt bed at a slower rate will take a longer time and still result in producing a salt solution of substantially constant concentration.

An improved procedure for maintaining the concentration of the salt solution constant, is to maintain the depth of the salt bed constant. In this way the inflow of water may be left at the maximum and the concentration of the salt solution maintained, without reducing the salt dissolving capacity of the apparatus.

Figure 4:
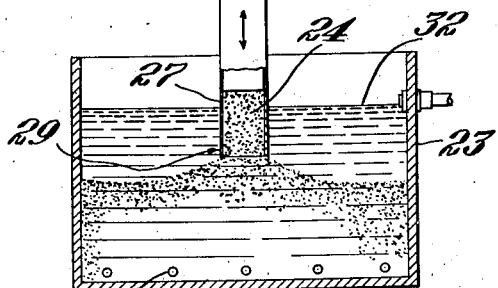
Fig. 4 is a diagrammatic representation of a modification of the dissolving tank showing means for controlling and maintaining the depth of the bed of salt uniform and at any given level.

This may be done by introducing salt to the dissolving tank and dispersing it over the bed so as to maintain the depth of the bed both uniform and constant. One means for so doing is shown in Fig. 4.

In this arrangement, salt is loaded into the hopper 22 which is conveniently mounted above the dissolving tank 23 and from which the salt 24 will flow by gravity through the vertical down-spout 25, into the bottom of the dissolving tank. The down-spout may be provided with a positive shut-off 26, for purposes of loading, cleansing, etc., or while changing the general operation of the dissolving tank, but will ordinarily be left wide open. The down-spout is also provided with a slideable sleeve 27 over its lower end, which may be adjusted up and down as desired and fixed in any given position by the clamp 28. By such adjustment, the vertical position of the open end 29 of the sleeve will fix the effective level for the release of the salt coming down from the hopper, into the dissolving tank, and hence the upper level of the salt bed, the lower level being fixed by the grid of water dispersing pipes 31 in the bottom of the tank. Such adjustment of the down-spout opening from the hopper, will thus serve to determine and control and maintain constant the depth of the bed of salt, throughout the continuous or discontinuous operation of the dissolving tank.

The grains of salt will not accumulate appreciably above the adjusted level of the bottom opening of the down-spout. On the other hand, if the upper surface of the bed of salt falls below such level the salt will flow out freely. The fact that the salt is wet in the lower end of the down-spout will promote such flow, plus the weight of the fresh charge of salt from above, and after release into the tank, beneath the aqueous solution 32 the fine grains of salt will spread out uniformly over the top surface of the salt bed and even into the corners, so as to maintain the depth of the bed not only constant, but substantially uniform from one point to another, throughout the cross-section of the tank.

Accordingly by such automatic adjustment and control of the salt supply and of the depth of the salt bed, in conjunction with the automatic adjustment and control of the water supply, operative, in step with the withdrawal of the salt solution from the reservoir tank or from the dissolving tank, a continuous supply of brine of fixed concentration is assured, for long periods of time and substantially independently if the water supply line is maintained and the hopper 22 is kept filled with salt.

Moreover, without interfering with the continuity of operation of the device, the concentration of the brine produced may be independently regulated to any absolute value desired, by regulating the maximum inflow of water through the inlet valve 16, the set of the float valve, the depth of the salt bed (by raising or lowering the sleeve valve), and by (or in step with) the temperature of the water supply, water of higher temperatures dissolving the salt somewhat faster and to develop a greater concentration in the resulting solution produced.

I claim:

1. A method of making an aqueous salt solution comprising continually introducing water into a bed of finely divided salt in a dissolver at a multiplicity of points distributed substantially uniformly near the bottom surface and substantially over the entire cross sectional area of said bed whereby to form a supernatant salt solution above said bed, introducing fresh salt to said bed and maintaining said bed at substantially level and predetermined height in said supernatant solution, and regulating the feed of water to the dissolver so as to maintain an overflow discharge of substantially constant concentration corresponding to the salt level and the amount of water introduced.

2. An apparatus for preparing an aqueous salt solution comprising a dissolver tank having means for supporting a salt bed therein and an overflow adjacent the top thereof, vertically adjustable salt feeding means extensible into said tank below said overflow and means for adjusting the feeding of the salt through said feeding means for forming and varying the depth of a salt bed in the dissolver, means for introducing water into said salt bed, said means comprising a plurality of openings distributed uniformly near and substantially over the entire extent of said salt bed supporting means for introducing the water into and uniformly throughout the salt bed, and means constructed to operate by changing level of solution above said salt supporting means for adjusting the volume of water introduced to the tank.

3. An apparatus for preparing an aqueous salt solution comprising a dissolver tank having means for supporting a salt bed therein and an overflow adjacent the top thereof, vertically adjustable salt feeding means extensible into said tank below said overflow and means for adjusting the feeding of the salt through said feeding means for forming and varying the depth of a salt bed in the dissolver, means for introducing water into said salt bed, said means comprising a plurality of openings distributed uniformly near and substantially over the entire extent of said salt bed supporting means for introducing the water into and uniformly throughout the salt bed, said openings being directed downwardly toward the salt bed supporting means and means constructed to operate by changing level of solution above said salt supporting means for adjusting the volume of water introduced to the tank.

EDWARD SWARTZ.